Dec. 10, 1963  J. S. EMOND  3,113,400
PLANT SUPPORT
Filed Sept. 14, 1960

INVENTOR.
JOSEPH S. EMOND
BY Everett J. Schroeder
ATTORNEY

United States Patent Office 3,113,400
Patented Dec. 10, 1963

3,113,400
PLANT SUPPORT
Joseph S. Emond, Farmington, Minn.
Filed Sept. 14, 1960, Ser. No. 56,021
1 Claim. (Cl. 47—45)

This invention relates to plant supports. More particularly, it relates to devices for use in conjunction with the growing of plants of the bushy fruit bearing type such as tomatoes wherein the fruit is relatively heavy and prevents the plant from supporting the same in an off the ground position unless an auxiliary support is provided.

It is a general object of my invention to provide a novel and improved plant support of unusually simple and inexpensive construction and operation.

A more specific object is to provide a novel and improved plant support of simple and inexpensive construction and increased efficiency which is capable of being collapsed into small compass for storage.

Another object is to provide a novel and improved plant support capable of being collapsed into small compass for storage and of being put to other additional valuable uses when in such collapsed position.

These and other objects and advantages of my invention will more fully appear from the following description, made in connection with the accompanying drawings, wherein like reference characters refer to the same or similar parts throughout the several views, and in which.

Figures 1, 2, 3:
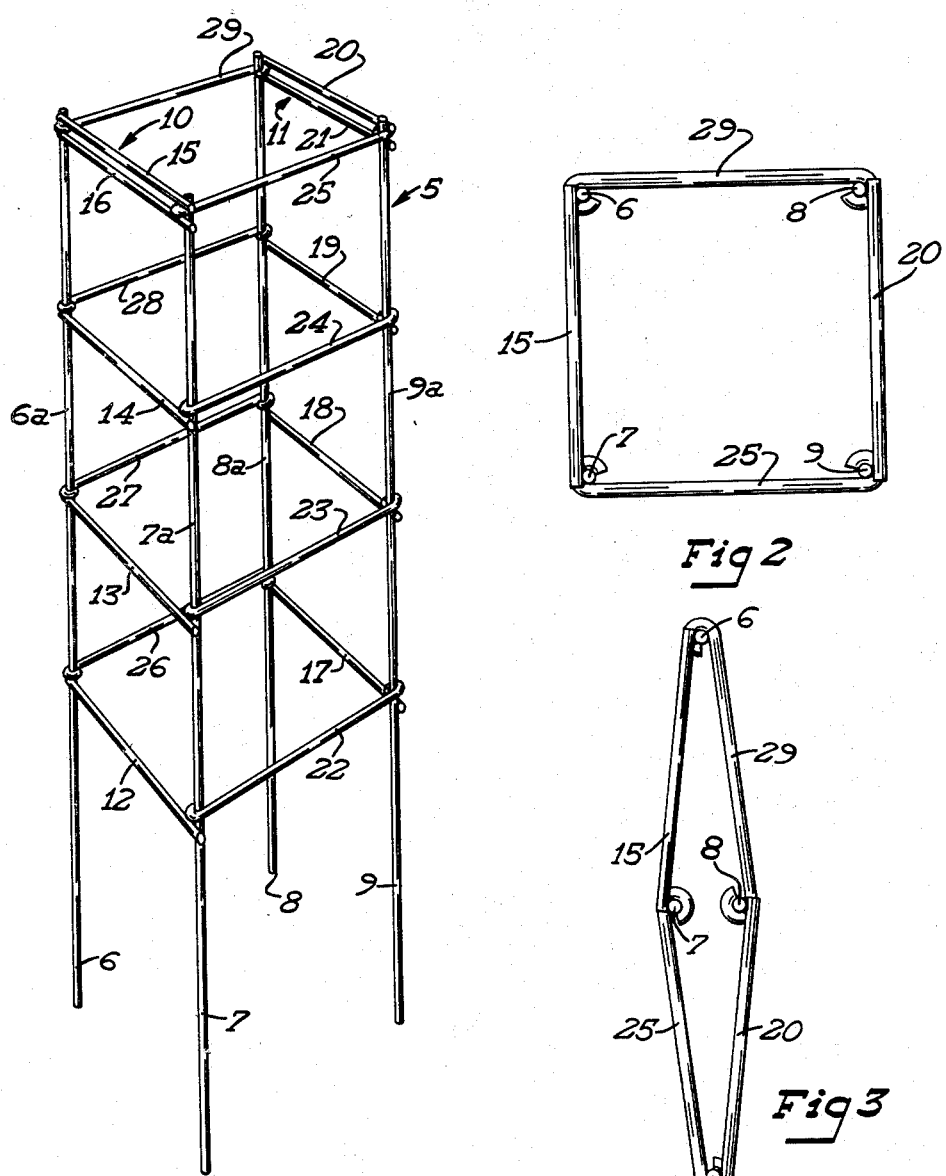
FIG. 1 is a perspective view of the preferred embodiment of my invention.
FIG. 2 is a plan view of the same.
FIG. 3 is a plan view of the same in collapsed position.

The embodiment shown in FIGS. 1–3 is comprised of a box like generally rectangularly shaped structure indicated generally by the numeral 5 which has a plurality of ground piercing elements 6, 7, 8, and 9 at its lower end. These ground piercing elements, as shown, are preferably straight and at least somewhat rigid wire rods which extend upwardly from their ground piercing portions and form the vertical side elements of a pair of oppositely disposed rectangularly shaped open framework sides indicated by the numerals 10 and 11. The side 10 includes the upward extensions 6a and 7a of the ground piercing portions of the elements 6 and 7 and these elements are connected by a plurality of vertically spaced horizontally extending rigid wire rods 12, 13, 14, and 15. These latter four rods are fixedly secured at their end portions to the elements 6a and 7a to form a rigid generally rectangularly shaped side characterized by its open framework construction. A fifth rigid rod or wire 16 is disposed a short distance below the rod 15 and is also fixedly secured to the elements 6a and 7a at its opposite ends.

The opposite side 11 has a plurality of transversely extending rigid wire rods 17, 18, 19, and 20 fixedly secured at their ends to the upwardly extending portions 8a and 9a of the ground piercing elements 8 and 9. These rods are vertically spaced as best shown in FIG. 1 and are fixedly secured at their end portions to the elements 8a and 9a to form a second side 11 which is generally rectangular in shape and is characterized by its open framework construction. A fifth rigid rod 21 is connected to the elements 8a and 9a at its ends in a manner similar to the rod 16 and is vertically spaced from the rod 20 in a similar manner to the spacing of rod 16 from rod 15.

Extending transversely between the elements 7a and 9a and pivotally connecting these latter two elements together is a plurality of vertically spaced elongate pivot members indicated by the numerals 22, 23, 24, and 25.

Each of these pivot members has an eye forming loop at its ends with one of the loops wrapped around one of the elements 7a and 9a so as to pivotally connect the two side members 10 and 11 along one of their edges. At the opposite side of the open framework 5 is a plurality of similarly constructed elongated pivot members, or rods, 26, 27, 28, and 29. As shown each of these latter pivot rods has a loop formed at each of its ends with one of the loops being wrapped around either the element 6a or the element 8a to pivotally connect the opposite longitudinal rods of the rectangular sides 10 and 11 together. It will be noted that the pivot members 25 and 29 are disposed with their loop ends between the rigid rods 15 and 16 and between the rigid rods 20 and 21 while each of the pivot members 24 and 28 is disposed above the rods 14 and 19 and the remaining pivot members are similarly secured above and adjacent to transverse rods.

In use the ground piercing elements 6, 7, 8, and 9 are forced into the ground by applying pressure to the upper portions of the framework 5 so as to surround or encircle the plant which is to be supported during its growth. As the plant proceeds to grow it is a simple matter to occasionally lift the leaves of the plant to an elevation above one of the various rods which extend horizontally between the vertical rods 6a, 7a, 8a, and 9a so that the leaves may be permitted to be at least partially supported by these rods. In this manner the plant will always be supported by the plant support 5 preventing damage thereto by wind and other excessive weather elements and, upon the completion of growth of the plants, will serve to support the weight of relatively heavy fruits borne by the plant. I have found that plants such as tomatoes which are heavy producers and the fruit of which have a heavy water content and thus are generally too weighty for the plant to support alone, grow very nicely within such a plant support as shown herein and will enable the grower to pick the fruit from an elevated position at considerable convenience and saving of labor as compared to when the same type of plants are grown without such a support. In addition, one of the primary advantages through the use of this type of support is that the fruit is maintained in an elevated position whence a very substantial saving is effected through the prevention of spoilage of the fruit which normally results when the fruit is permitted to rest upon the ground.

It will be noted that my plant support is collapsible and can be collapsed to extend in substantially a single vertical plane as shown in FIG. 3. This is accomplished by merely pressing the elements 7a and 8a toward each other whereupon the entire open framework will collapse to the position shown in FIG. 3. When in such collapsed position it is a relatively simple matter to store my plant support in small compass and a plurality of them can be hung upon a nail on a wall or similar support in an out of way position. In addition to the above I have found that when my plant support is in collapsed position it also may be utilized in an additional manner as a trellis for plants of the vine type which need support either adjacent a wall or in an entirely exposed position. Thus my collapsible support is a dual function device which may be utilized in extended position as a support for bushy heavy bearing fruit type plants or in collapsed position as a support and growth directing means for plants of the ivy type. Many flowers, for example even those not of the strictly ivy type, require some type of support in order to maintain themselves in an erect position during their later stages of growth and my support in its collapsed position readily provides guiding means and support means for such plants.

The open framework 5 is a relatively simple and inexpensive device to construct and yet has a maximum of utility and convenience both for use and storage. I have found they can be manufactured and sold very inexpensively and are extremely functional for their intended purposes.

It will, of course, be understood that various changes may be made in the form, details, arrangement and proportions of the parts without departing from the scope of my invention which consists of the matter shown and described herein and set forth in the appended claim.

What is claimed is:

A plant support, comprising a pair of elongate rectangular frames adapted to be vertically positioned in use and each of which frames embodies a pair of relatively rigid spaced parallel side rods and a plurality of transverse connecting rods positioned across said side rods, said connecting rods of each frame being in spaced parallel relation in the longitudinal direction of the side rods and each of the connecting rods being rigidly secured adjacent its ends to the adjacent side rods, two of said transverse connecting rods of each frame adjacent to the top of the frame being in relatively closely spaced relation as compared to the spacing of the remaining transverse connecting rods, said side rods having portions extending at the lower ends of the frames beyond the lowermost transverse connecting rods to provide ground penetrating means, a plurality of pivot rods spaced longitudinally of and connecting the side rods of one of said frames with corresponding side rods of the other frame by pivot eyes at the ends of the pivot rods having the side rods extending loosely therethrough, the uppermost ones of said pivot rods connecting adjacent side rods of the two frames having the pivot eyes at the ends thereof lying between the adjacent two of said closely spaced transverse top rods and being restrained thereby against movement longitudinally of the side rods but being free to turn thereon, and the other spaced pivot rods having the pivot eyes thereof positioned above and resting upon underlying transverse connecting rods and being free to have both turning movement about the side rods and sliding movement on and longitudinally of the side rods in the space between adjacent transverse connecting rods.

References Cited in the file of this patent

UNITED STATES PATENTS

| | | |
|---|---|---|
| 374,906 | Rovane | Dec. 13, 1887 |
| 576,815 | Grant | Feb. 9, 1897 |
| 719,060 | Thomas | Jan. 27, 1903 |
| 1,083,450 | Lytle | Jan. 6, 1914 |
| 1,218,115 | Phillipps | Mar. 6, 1917 |
| 1,499,665 | Kaufman | July 1, 1924 |
| 2,651,502 | Carvelo | Sept. 8, 1953 |

FOREIGN PATENTS

| | | |
|---|---|---|
| 18,466 | Great Britain | of 1912 |